(12) United States Patent
Powers et al.

(10) Patent No.: US 7,909,295 B2
(45) Date of Patent: Mar. 22, 2011

(54) WALL- OR ARM-MOUNTING FOR AN ALL-IN-ONE PERSONAL COMPUTER

(76) Inventors: Scott Powers, New Baltimore, MI (US); Joseph Szacon, Clinton Township, MI (US)

( * ) Notice: Subject to any disclaimer, the term of this patent is extended or adjusted under 35 U.S.C. 154(b) by 219 days.

(21) Appl. No.: 12/221,394

(22) Filed: Aug. 1, 2008

(65) Prior Publication Data
US 2009/0039221 A1   Feb. 12, 2009

Related U.S. Application Data

(60) Provisional application No. 60/963,823, filed on Aug. 7, 2007.

(51) Int. Cl.
*F16L 3/00* (2006.01)
(52) U.S. Cl. .............. 248/121; 248/222.14; 248/224.8; 248/304; 248/917
(58) Field of Classification Search .......... 248/686, 248/121, 56, 220.21, 220.31, 222.14, 224.8, 248/231.9, 304, 917
See application file for complete search history.

(56) References Cited

U.S. PATENT DOCUMENTS

| | | | | |
|---|---|---|---|---|
| 4,733,618 A * | 3/1988 | Sarro et al. | ...................... | 108/140 |
| 6,189,850 B1 * | 2/2001 | Liao et al. | ................ | 248/292.14 |
| 6,418,010 B1 * | 7/2002 | Sawyer | ..................... | 361/679.05 |
| 6,695,265 B2 * | 2/2004 | Neuhof et al. | ................... | 248/56 |
| 7,252,274 B1 * | 8/2007 | Brannen | ........................ | 248/301 |
| 7,331,551 B2 * | 2/2008 | Oddsen, Jr. | ................. | 248/279.1 |
| 7,424,994 B2 * | 9/2008 | Jeong | .......................... | 248/278.1 |
| 7,499,265 B2 * | 3/2009 | She | ............................. | 361/679.22 |
| 2005/0041379 A1 * | 2/2005 | Jang | .............................. | 361/681 |
| 2005/0230573 A1 * | 10/2005 | Ligertwood | .................. | 248/158 |
| 2007/0076358 A1 * | 4/2007 | Hsu | ................................ | 361/681 |
| 2007/0246624 A1 * | 10/2007 | Lin | ............................. | 248/231.9 |

* cited by examiner

*Primary Examiner* — T. Mckinnon
*Assistant Examiner* — Bradley H Duckworth
(74) *Attorney, Agent, or Firm* — George L. Boller

(57) ABSTRACT

A mounting for an all-in-one personal computer (10) that has a stand (12) for supporting the computer on a table or desk to enable the computer to be mounted on a wall or at the end of an articulated arm. A bracket (16) has a first wall (16A) that is disposed to confront a face of the stand surrounding the through-hole in the stand and that contains a through-hole (24) that registers with a through-hole (26) in the stand and a second wall (16B) that joins with the first wall and that contains a VESA compliant hole pattern that provides for attachment to a VESA compliant member. A hollow bolt (20) and a nut (22) coact with the registered through-holes to hold the first wall of the bracket fast on the stand.

9 Claims, 5 Drawing Sheets

WALL- OR ARM-MOUNTING FOR AN ALL-IN-ONE PERSONAL COMPUTER

REFERENCE TO A RELATED APPLICATION AND PRIORITY CLAIM

This application claims the priority of Provisional Patent Application No. 60/963,823, filed 7 Aug. 2007, in the names of the inventors.

FIELD OF THE INVENTION

This invention relates to personal computers in which the processing system, drives, and monitor are contained in a single unit that is supported by an upright stand having a base that sits on a table or desk.

BACKGROUND OF THE INVENTION

Such personal computers are sometimes called all-in-one computers. One such computer is the IMAC™ computer.

The inventors believe that the advantages of an all-in-one personal computer can be extended by enabling the computer to be supported in a more versatile manner than merely by a stand that sits on a table or desk.

SUMMARY OF THE INVENTION

Accordingly, the inventors have developed a mounting system comprising an adapter bracket that they believe can improve the versatility of such a computer. The bracket enables a user to support an all-in-one computer by a wall- or arm-mounting. Use of the bracket for a wall- or arm-mounting enables the computer to be used more conveniently by some users and/or in situations where the existing stand would not be suitable. While the arm in some arm-mountings may be an articulated arm, the inventive mounting system can also be used with arms, non-articulated arms, and on carts. Hence, the bracket offers the possibility for expanding the market for such computers.

The bracket has a VESA compliant hole pattern that provides for attachment to a VESA compliant member, such as one at the end of an arm for enabling the computer to be arm-mounted.

One general aspect of the invention relates to a mounting for an all-in-one personal computer that comprises a stand for supporting the computer wherein the stand comprises a through-hole through which cables coming out of the computer can pass.

The mounting comprises a bracket comprising a first wall that is disposed to confront a face of the stand surrounding the through-hole in the stand and a second wall that joins with the first wall and that contains a feature, such as a defined hole pattern, providing for attachment of the second wall to a member of the mounting.

A fastening device coacts with the through-hole in the stand to hold the first wall of the bracket fast on the stand.

Another general aspect of the invention relates to a method of wall- or arm-mounting an all-in-one personal computer comprising a table- or desk-stand for supporting the computer and having a wall containing a through-hole through which cables coming out of the computer pass.

The method comprises unthreading the cables from the through-hole, disposing a first wall of a bracket against the wall of the stand so that a through-hole in the first wall of the bracket registers with the through-hole in the stand, and holding the first wall of the bracket fast on the stand by passing the threaded shank of a hollow bolt through the registered through-holes to cause a distal end of the shank to protrude beyond the registered through-holes, threading a nut onto the distal end of the shank, and tightening the nut and bolt together to force an outer margin of a head of the bolt toward the margin of one of the registered through-holes and a margin of the nut toward the margin of the other of the registered through-holes, and fastening another wall portion of the bracket that contains a defined hole pattern to a member of the wall- or arm-mounting.

The foregoing, along with further aspects, features, and advantages of the invention, will be seen in the following disclosure of a presently preferred embodiment of the invention depicting the best mode contemplated at this time for carrying out the invention. The disclosure includes drawings, briefly described as follows.

DESCRIPTION OF THE PREFERRED EMBODIMENT

Figures 1, 2:
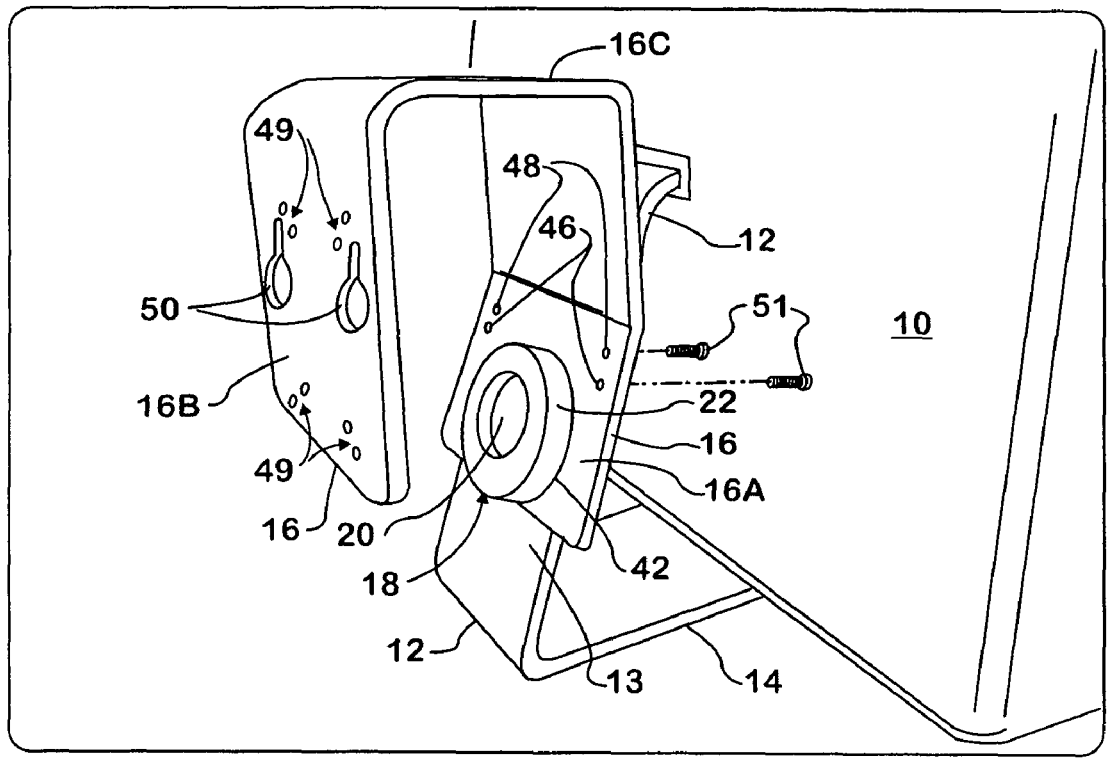
FIG. 1 shows a wall mounting bracket fastened to a computer stand in accordance with the fastening system of present invention.
FIG. 2 is a cross section view through the fastening system.
Figure 3:
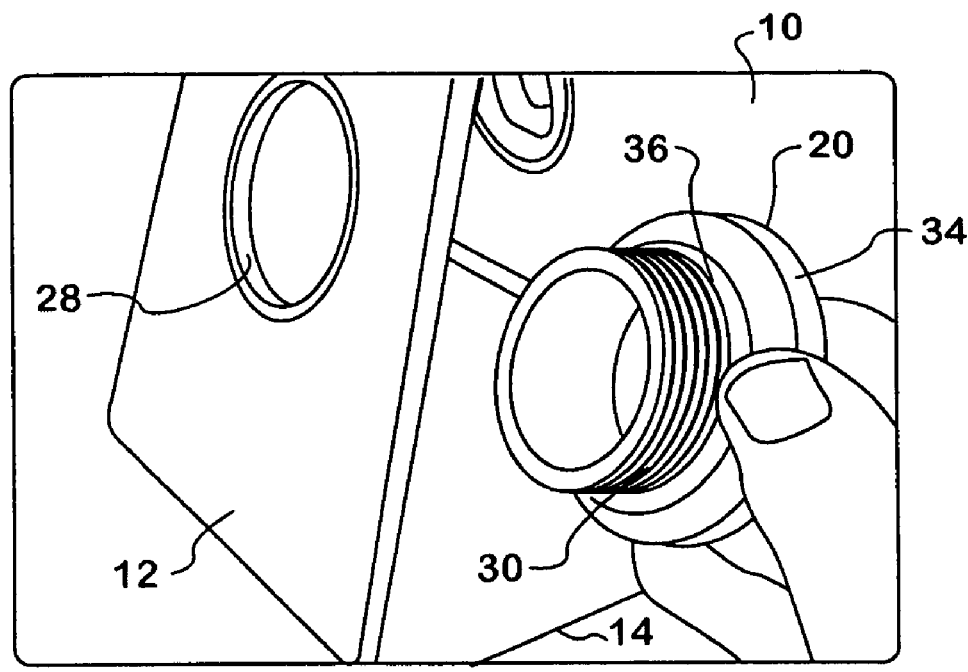
FIGS. 3, 4, and 5 show a sequence of steps in the fastening process.
Figure 4:
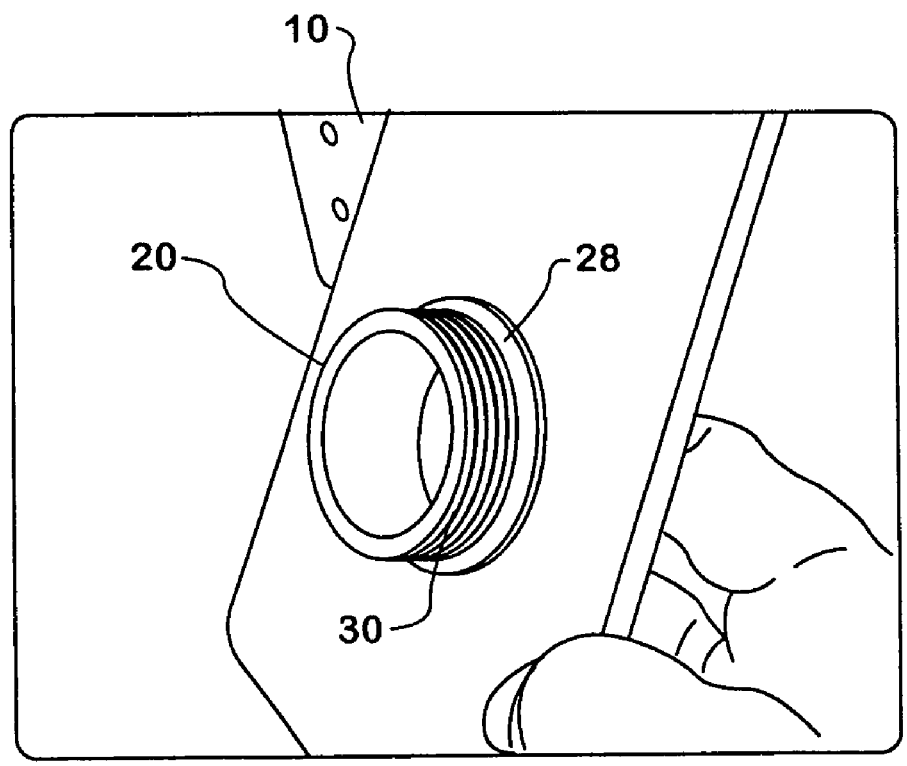
Figure 5:
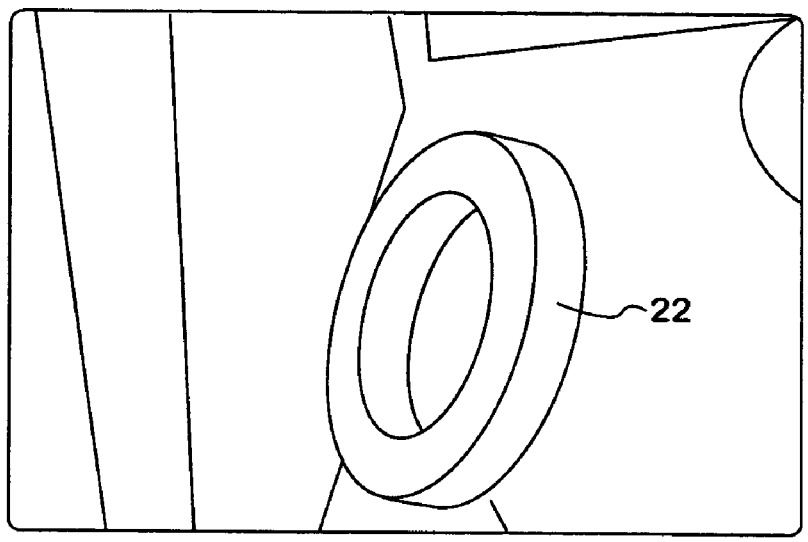

The lower rear portion of an IMAC™ computer 10 is shown in a perspective view from the left rear in FIG. 1. A centrally located stand 12 has a generally upright wall portion 13 that extends from the back of the computer casing rearward and downward at an angle where it merges into a flat horizontal foot 14 that extends forward below the bottom of the computer. Stand 12 serves to stably support computer 10 on an underlying horizontal surface a short distance above the level of the surface.

At times, a user may desire to support computer 10 using a wall- or arm-mounting. The drawings show a wall mounting bracket 16 that is fastened to stand 12 by a fastening system 18 comprising a hollow bolt 20 and a nut 22. The present invention relates to this fastening system.

Stand 12 has a circular through-hole 26 that is lined by a plastic bushing 28. (see FIG. 2 also). Cables that exit the computer, including their connectors, can pass through bushing 28. Bracket 16 has a through-hole 24 that is essentially the same diameter as the inside diameter of bushing 28.

To attach bracket 16 to stand 12, the cables are unthreaded from the bushing, and the angled wall portion 16A at one end of bracket 16 is placed flat against the outer back face of the generally upright wall portion of the stand, aligning through-hole 24 with bushing 28 in the process. The shank of bolt 20 is passed through from one side, specifically from the inner front face of the stand. The threaded end 30 of the bolt shank protrudes from through-hole 24 on the opposite side of the abutted portions of the stand and bracket, and nut 22 is threaded onto it and tightened.

Bushing 28 has a small lip 32 on the side that is toward computer 10. The head 34 of bolt 20 contains a circular groove 36 surrounding the shank to provide clearance for lip 32 so that when nut 22 is fully tightened, the flat margin 38 of the inner face of head 34 surrounding groove 36 abuts the front face 40 of the stand while the flat inner face 42 of nut 22 abuts the flat face 44 of the bracket surrounding through-hole 24. The result is a secure attachment of the bracket to the stand.

An anti-rotation feature may be incorporated in the bracket to keep the bracket from turning on the stand as the nut and bolt are being tightened. Two sets of threaded holes 46, 48 are provided in the bracket. The holes of one pair are slightly farther apart than those of the other. Depending on the width of stand 12, screws 51 are threaded into the holes of one pair so that protruding ends of the screws closely straddle the side edges of the stand.

With the attachment complete, the cables may be re-threaded through the interior of the bolt that is open at both ends. The bracket may then be hung on a wall. Alternately, the bracket may be mounted on the wall first, and the stand attached to the bracket afterward. The bracket may be hung via the two spaced apart holes 50, that include vertical slots, in a wall portion 16B.

Figure 6:
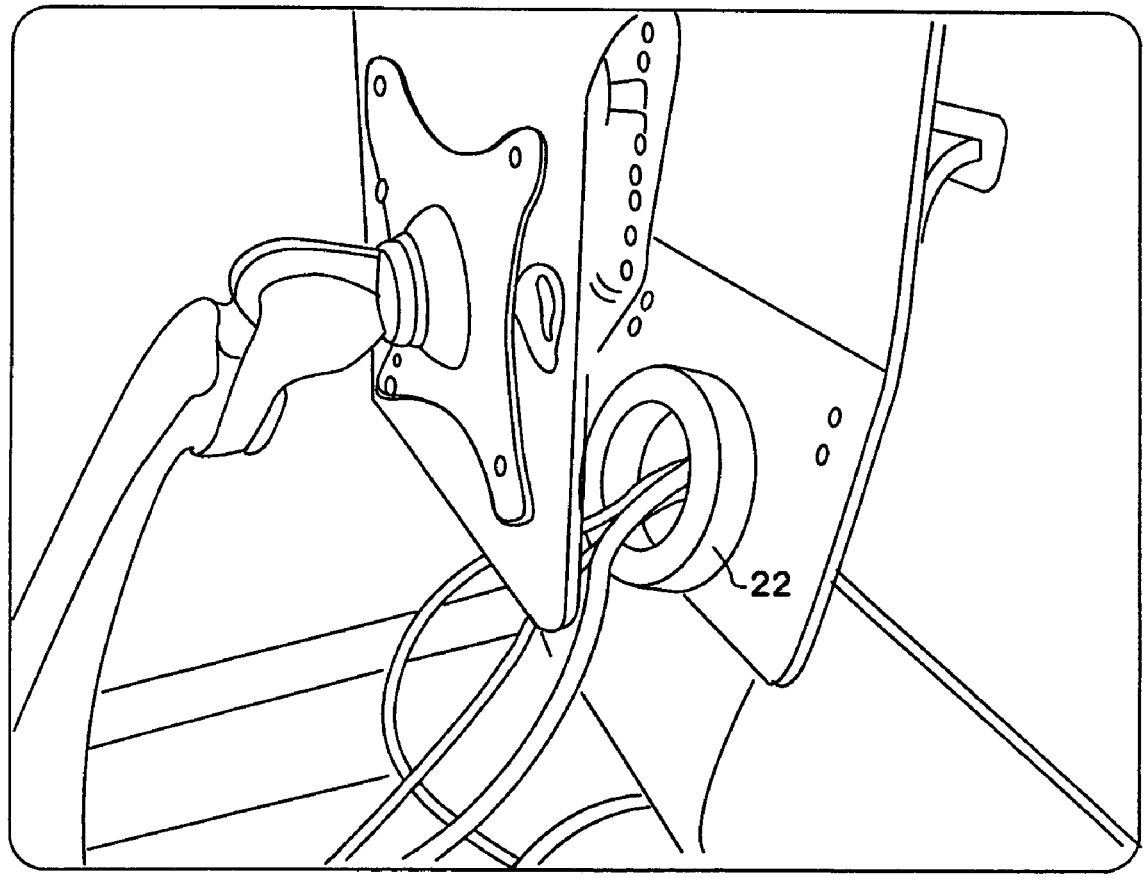
FIG. 6 shows the completed installation.

The bracket wall portion 16B contains a VESA compliant hole pattern 49 that provides for attachment to a VESA compliant end of an arm when computer 10 is to be arm-mounted, as shown in FIG. 6. The wall portion 16B containing the VESA compliant hole pattern is spaced from the wall portion 16A containing through-hole 24 by a third wall portion 16C so that the VESA compliant hole pattern is further from the computer. As viewed from the side, as in FIG. 1, the bracket has a generally inverted U-shape, with the leg that contains wall portion 16A having a bend just above holes 48. The particular VESA compliant hole pattern shown that provides both a 100 mm×100 mm and a 75 mm×75 mm VESA interface. Generic principles of the invention are not limited to any particular interface pattern.

By making the nut and bolt with fine threads and knurling the outer side edge, i.e. the outer circumference, of the nut and/or the bolt head, a person's hand can apply sufficient force to adequately tighten the nut and bolt together, making the use of a tool unnecessary, although general principles of the invention contemplate that the nut and bolt could have wrench surfaces to allow tightening by tools.

A modified embodiment appears in FIG. 7, but uses the same reference numerals to designate the same items as already described in connection with previous Figures.

The bracket is no longer an inverted U-shape. Rather the wall portion 16B containing the VESA compliant hole pattern 49 and the wall 16A containing through-hole 24 join together along a bend that inclines the former wall portion to the latter wall portion, as shown.

Bushing 28 is different in that it lacks lip 32 and has an axial length substantially equal to the thickness of wall portion 13 of stand 12 to thereby line through-hole 26. An elastomeric O-ring 52 seats in groove 36 of bolt head 34. The face of nut 22 that is toward wall 16A also contains a circular groove, and an elastomeric O-ring 54 seats in it.

The two O-rings, nut 22, and bolt 20 are dimensioned such that when the nut is tightened onto the bolt to clamp bracket 16 to stand 12, both O-rings are compressed, with O-ring 52 being compressed between the bolt head and the inner face of stand 12, and O-ring 54 being compressed between the nut and the outer face of stand bracket wall 16A. The presence of the O-rings avoids metal-to-metal contact of the nut to the bracket and of the bolt head to the stand, and consequently avoids scuffing of the bracket and stand surfaces. It also provides frictional contact that enhances the attachment. If desired, felt pads, such as shown by the reference numerals 58, may be placed between confronting surfaces of the bracket and stand as shown to avoid metal-to-metal contact. The anti-rotation screws 51 are screwed into the appropriate holes, either 46 or 48. Bumper caps can be used to cap the ends of the screws that straddle the side edges of the stand.

Figure 7:
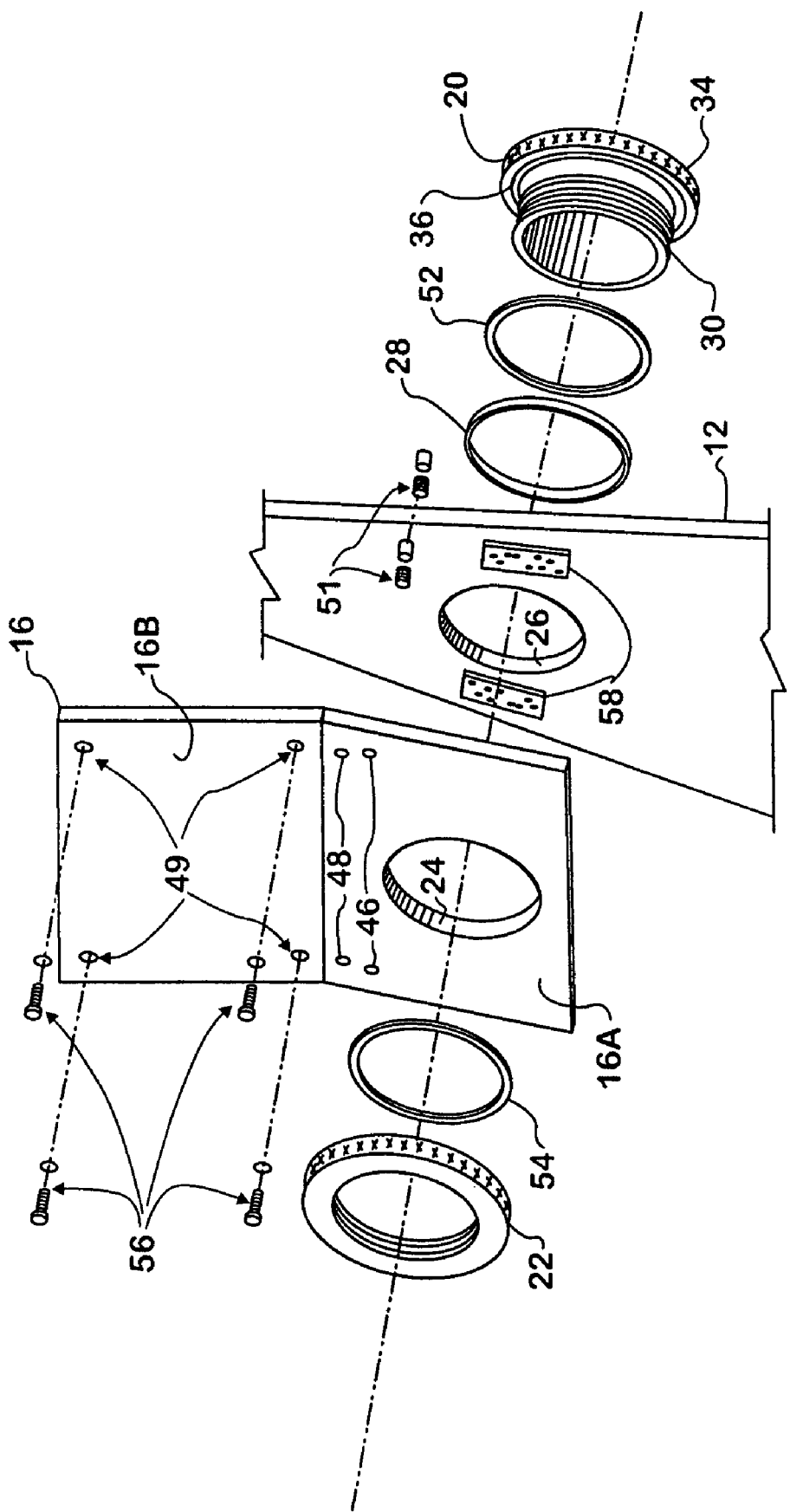
FIG. 7 is an exploded view showing a modified embodiment having a different bracket and other features.

FIG. 7 also shows four screws and lock washers 56 ready to be associated with the outer four holes of the VESA compliant pattern in wall portion 16B.

Figure 8:
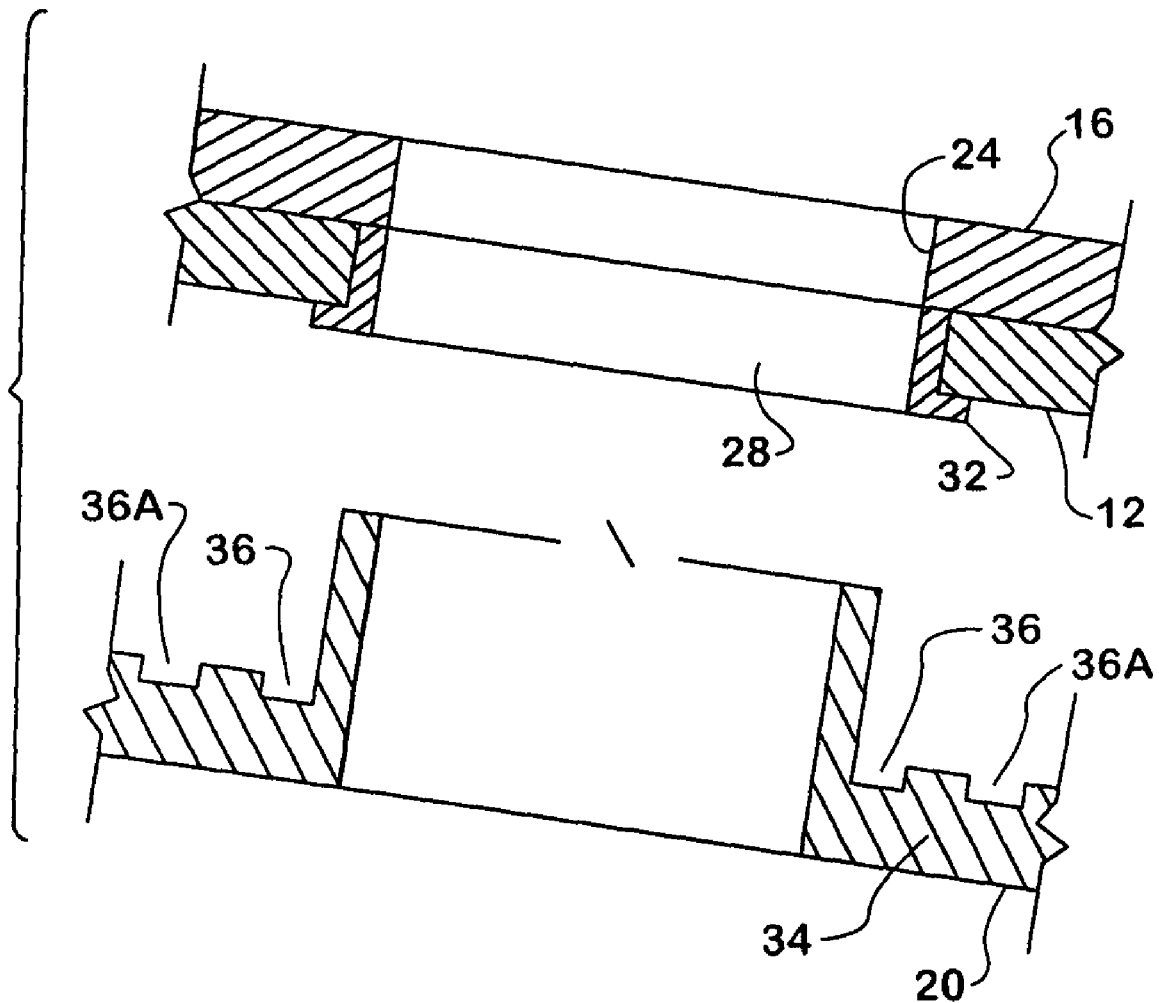
FIG. 8 is a cross section view showing a further modified form applicable to both brackets.

FIG. 8 shows a further modified form where bolt 20 is like the one shown in FIG. 2, but has a second groove 36A surrounding groove 36. Groove 36 provides clearance for a bushing 28 having a rim 32, as shown. An O-ring 52 like the one shown in FIG. 7, but of larger diameter, seats in groove 36A. The nut 22 and O-ring 54 of FIG. 7 are used with the bolt of FIG. 8.

Various materials may be used for the disclosed brackets and other parts depending on specific application. Stainless steel and aluminum are examples of materials suitable for making the brackets.

Various parts can be packaged as an after-market adapter kit for an existing computer. A typical kit based on the FIG. 7 embodiment includes bracket 16, bolt 20, nut 22, bushing 28, O-rings 52, 54, screws 51 with bumper caps, screws and lock washers 56, pads 58, and an Allen wrench for use with the screws. Bushing 28 is provided for use in certain stands that have a somewhat larger through-hole and lack the rimmed bushing shown in FIG. 2.

While a presently preferred embodiment of the invention has been illustrated and described, it should be appreciated that principles of the invention are applicable to all embodiments that fall within the scope of the following claims.

What is claimed is:

1. A mounting that comprises:
 a stand for engaging a rear of an all-in-one personal computer, the stand comprising a foot for resting on a horizontal surface in underlying relation to an all-in-one personal computer and an upright wall extending from the foot for engaging and supporting an all-in-one personal computer, the upright wall comprising a through-hole through which cables coming out of an all-in-one personal computer can pass;
 a bracket comprising a first wall that is disposed against an outer face of the upright wall that faces away from the rear of an all-in-one personal computer, the first wall comprising a through-hole that registers with the through-hole in the upright wall of the stand, and the bracket comprising a second wall that joins with the first wall and that contains a feature providing for attachment of the second wall to a mounting member so that the stand will be supported from the mounting member by the bracket when the second wall is attached to the mounting member;
 and a fastening device comprising two members that coact to hold the first wall of the bracket fast against the upright wall of the stand by acting respectively on an outer face of the first wall of the bracket and on an inner face of the upright wall of the stand that is opposite the outer face of the upright wall of the stand and that surrounds the through-hole in the upright wall of the stand to hold the bracket fast on the stand, the two members collectively comprising a through-passage through which cables coming out of an all-in-one personal computer can pass.

2. A mounting as set forth in claim 1 wherein the two members of the fastening device are tightly threaded to each other to create a force that forces the first wall of the bracket against the upright wall of the stand.

3. A mounting as set forth in claim 2 wherein one member of the fastening device comprises a nut whose outer circumference overlaps, and is forced toward, the margin of one of the through-holes.

4. A mounting as set forth in claim 3 wherein the other member of the fastening device comprises a bolt having a threaded shank that is threaded to the nut and a head whose outer circumference overlaps, and is forced toward, the margin of the other of the through-holes.

5. A mounting as set forth in claim 4 wherein the outer circumference of one or both the nut and the bolt head is knurled.

6. A mounting as set forth in claim 4 wherein the outer circumference of the nut comprises a groove facing the margin of the one through-hole, the bolt head comprises a groove surrounding the shank and facing the margin of the other of the through-holes, and a respective O-ring is seated in each groove and held compressed to space the outer circumferences of the bolt head and the nut respectively from the margins of the respective through-holes.

7. A mounting as set forth in claim 1 wherein the first and second walls of the bracket are joined by a third wall so as to space the second wall of the bracket further from the computer than the first wall of the bracket.

8. A mounting as set forth in claim 1 wherein the first and second walls of the bracket join together along a bend that inclines the second wall to the first wall.

9. A mounting as set forth in claim 1 including one or more fasteners threaded to the first wall of the bracket to provide an interference with the upright wall of the stand that prevents turning of the bracket relative to the stand about an axis passing through the through-hole in the upright wall of the stand.

* * * * *